(12) United States Patent
Park et al.

(10) Patent No.: US 12,586,838 B2
(45) Date of Patent: Mar. 24, 2026

(54) BATTERY PACK

(71) Applicant: SK ON CO., LTD., Seoul (KR)

(72) Inventors: Ju Yong Park, Daejeon (KR); Min Song Kang, Daejeon (KR); Sei Hoon Cho, Daejeon (KR); Jin Su Han, Daejeon (KR); Ji Woong Kim, Daejeon (KR); Byeong Jun Pak, Daejeon (KR)

(73) Assignee: SK ON CO., LTD., Seoul (KR)

( * ) Notice: Subject to any disclaimer, the term of this patent is extended or adjusted under 35 U.S.C. 154(b) by 634 days.

(21) Appl. No.: 17/958,144

(22) Filed: Sep. 30, 2022

(65) Prior Publication Data

US 2023/0095960 A1 Mar. 30, 2023

(30) Foreign Application Priority Data

Sep. 30, 2021 (KR) ........................ 10-2021-0129490

(51) Int. Cl.
*H01M 10/6554* (2014.01)
*H01M 10/6556* (2014.01)
*H01M 50/35* (2021.01)

(52) U.S. Cl.
CPC ... *H01M 10/6554* (2015.04); *H01M 10/6556* (2015.04); *H01M 50/35* (2021.01)

(58) Field of Classification Search
None
See application file for complete search history.

(56) References Cited

U.S. PATENT DOCUMENTS

| | | | |
|---|---|---|---|
| 12,281,823 B2 * | 4/2025 | Jin ..................... | B60H 1/00278 |
| 2013/0004822 A1 | 1/2013 | Hashimoto et al. | |
| 2013/0209857 A1 * | 8/2013 | Lev ..................... | H01M 10/625 |
| | | | 53/436 |
| 2017/0149103 A1 * | 5/2017 | Yang ................. | H01M 10/6556 |
| 2018/0205045 A1 | 7/2018 | Schroder et al. | |
| 2019/0319318 A1 * | 10/2019 | Park ................. | H01M 10/6552 |
| 2021/0075077 A1 * | 3/2021 | Kwag ................. | H01M 10/613 |

(Continued)

FOREIGN PATENT DOCUMENTS

| | | |
|---|---|---|
| CN | 110190211 A | 8/2019 |
| DE | 102016001145 A1 | 8/2017 |

(Continued)

OTHER PUBLICATIONS

Velling, Limits and Fits, Fractory, available at https://fractory.com/limits-and-fits/, last visited Apr. 24, 2025 (Year: 2025).*

(Continued)

*Primary Examiner* — Scott J. Chmielecki
(74) *Attorney, Agent, or Firm* — Perkins Coie LLP

(57) ABSTRACT

A battery pack includes: a first cooling plate including a first cooling path, along which a refrigerant is circulated, and a first inlet pipe connected to the first cooling path; a second cooling plate including a second cooling path, along which a refrigerant is circulated, and a second inlet pipe connected to the second cooling path and sealingly engaged to the first inlet pipe; a main supply pipe branching from the first inlet pipe or the second inlet pipe and supplying a refrigerant to the first inlet pipe and the second inlet pipe; and a pack unit body including at least one battery cell and disposed between the first cooling plate and the second cooling plate.

10 Claims, 8 Drawing Sheets

(56) References Cited

U.S. PATENT DOCUMENTS

| | | | |
|---|---|---|---|
| 2021/0288298 A1* | 9/2021 | Ramadan | ................ B60L 50/64 |
| 2022/0059901 A1 | 2/2022 | Ren et al. | |
| 2024/0204290 A1* | 6/2024 | Lee | .................... H01M 10/653 |
| 2024/0204292 A1* | 6/2024 | Gier | ................. H01M 10/6554 |
| 2024/0204294 A1* | 6/2024 | Shin | .................... H01M 50/209 |
| 2024/0237314 A1* | 7/2024 | Stevens | .............. H01M 10/486 |

FOREIGN PATENT DOCUMENTS

| | | | |
|---|---|---|---|
| EP | 3528336 A1 | 8/2019 | |
| KR | 10-2034495 B1 | 10/2019 | |

OTHER PUBLICATIONS

Extended European Search Report for European Patent Application No. 22198099.8, mailed Feb. 23, 2023 (8 pages).

\* cited by examiner

BATTERY PACK

CROSS-REFERENCE TO RELATED APPLICATION(S)

This patent document claims the priority and benefits of Korean Patent Application No. 10-2021-0129490 filed in the Korean Intellectual Property Office on Sep. 30, 2021, the entire disclosure of which is incorporated herein by reference for all purposes.

TECHNICAL FIELD

The present disclosure relates to a battery pack.

BACKGROUND

A secondary battery is a battery capable of charging and discharging electricity, and has a wide application range, including to relatively small portable electronic devices, mid-sized to large-sized automobiles, and power storage devices.

A secondary battery may be used as a secondary battery cell, and the secondary battery cell may have a configuration in which a stack body, including a positive electrode, a negative electrode, and a separator, is disposed in an exterior material and an electrolyte fills the inside of the exterior material. When a plurality of secondary battery cells are electrically connected to form a battery pack, capacity and an output amount of the battery pack may be increased.

However, a plurality of secondary battery cells, arranged to be dense in a battery pack, may be overcharged and exposed to various events such as a high-temperature external environment at any time, so that the battery pack may have a risk of ignition or explosion.

SUMMARY

The disclosed technology can be implemented in some embodiments to improve cooling efficiency of a battery cell.

The disclosed technology can also be implemented in some embodiments to improve assembly efficiency and space utilization efficiency of a battery cell.

According to an aspect of the present disclosure, a battery pack includes: a first cooling plate including a first cooling path, along which a refrigerant is circulated, and a first inlet pipe connected to the first cooling path; a second cooling plate including a second cooling path, along which a refrigerant is circulated, and a second inlet pipe connected to the second cooling path and sealingly coupled, connected, or engaged to the first inlet pipe; a main supply pipe branching from the first inlet pipe or the second inlet pipe and supplying a refrigerant to the first inlet pipe and the second inlet pipe; and a pack unit body including at least one battery cell and disposed between the first cooling plate and the second cooling plate.

The first cooling plate may further include a first outlet pipe connected to the first cooling path, and the second cooling plate may further include a second outlet pipe connected to the second cooling path and sealingly coupled, connected, or engaged to the first outlet pipe. The battery pack may further include a main outlet pipe branching from the first outlet pipe or the second outlet pipe and discharging a refrigerant, received from the first outlet pipe and the second outlet pipe, to the outside.

The first inlet pipe may be coupled to the second inlet pipe in a coupling direction, parallel to a height direction of the battery cell.

The main supply pipe and the main outlet pipe may allow a refrigerant to flow in a first flow direction, perpendicular to the coupling direction. The first inlet pipe, the first outlet pipe, the second inlet pipe, and the second outlet pipe may allow a refrigerant to flow in a second flow direction, parallel to the coupling direction.

At least one of the first inlet pipe and the first outlet pipe may be provided such that an external diameter in a coupling portion to at least one of the second inlet pipe and the second outlet pipe is smaller than an internal diameter in a coupling portion to at least one of the second inlet pipe and the second outlet pipe. The first inlet pipe and the first outlet pipe may be fitted and coupled to the second inlet pipe and the second outlet pipe, respectively.

The first inlet pipe and the first outlet pipe may be provided to have a loose fit tolerance or a medium fit tolerance to the second inlet pipe and the second outlet pipe, respectively.

The battery pack may further include: a sealing member disposed in at least one of a position between an external surface of the first inlet pipe and an internal surface of the second inlet pipe and a position between an external surface of the first outlet pipe and an internal surface of the second outlet pipe.

The battery pack may further include: a side frame facing the pack unit body; and a cover member disposed between the first cooling plate or the second cooling plate and the pack unit body to cover the pack unit body.

The cover member may be disposed between the first cooling plate and the pack unit body, and the battery pack may further include a heat transfer material disposed in at least one of a position between the cover member and the first cooling plate and a position between the cover member and the pack unit body.

The heat transfer material may also be disposed between the pack unit body and the second cooling plate.

At least one of the first inlet pipe, the first outlet pipe, the second inlet pipe, the second outlet pipe, the main supply pipe, and the main outlet pipe may be provided to be flexible.

The side frame may have a first venting hole and a second venting hole connected to the outside, and the side frame may further include a partition wall frame having a third venting hole connected to the first venting hole and connected to the side frame such that the third venting hole faces the pack unit body.

The above and other aspects and implementations of the disclosed technology are described in greater detail in the drawings, the description, and the claims.

DETAILED DESCRIPTION

Figure 1:
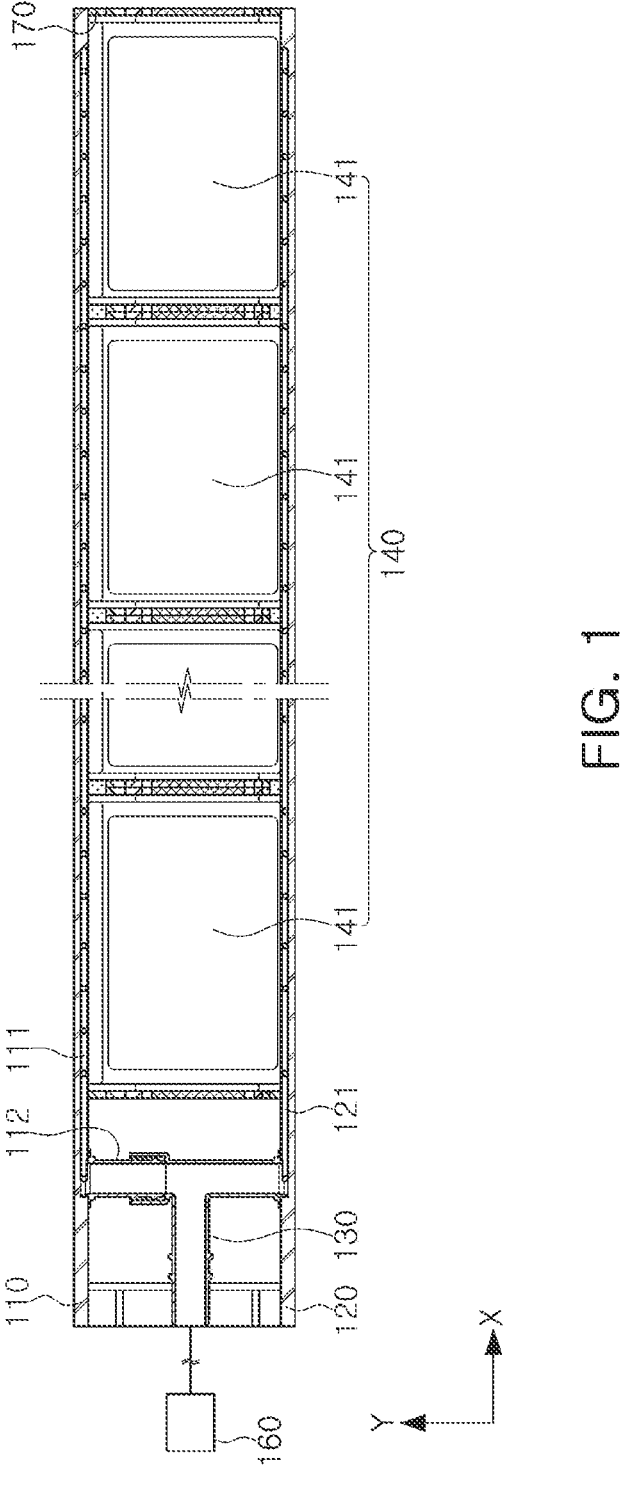
FIG. 1 is a schematic cross-sectional view of a battery pack according to an embodiment of the present disclosure.

In order to help in an understanding of a description of embodiments of the present disclosure, elements indicated with the same reference numerals in the accompanying drawings are the same elements, and related elements among the elements that perform the same action in each embodiment are marked with the same numeral or related numerals.

In addition, in order to clarify a gist of the present disclosure, a description of elements and techniques well known in the prior art will be omitted, and hereinafter, the present disclosure will be described in detail with reference to the accompanying drawings.

However, it can be understood that the spirit of the present disclosure is not limited to embodiments to be provided, and specific components may be proposed in other forms in which specific elements are added, changed, or deleted by those skilled in the art, but this is also included within the scope of the same spirit as the present disclosure.

Hereinafter, in the accompanying drawings, an X-axis is a width direction of a battery cell, a Y-axis is a height direction of the battery cell, and a Z-axis is a thickness direction of the battery cell. However, these directions are only set for ease of description and may be appropriately vary depending on usage environments of a battery, specifications required for the battery, and the like. Embodiments of the present disclosure to be described below are not interfered with by directions related to the battery cell.

FIG. 1 is a schematic cross-sectional view of a battery pack according to an embodiment of the present disclosure.

As illustrated in FIG. 1, a battery pack according to an embodiment may include a first cooling plate 110 having a first cooling path 111 therein, a second cooling plate 120 having a second cooling path 121 therein, and a pack unit body 140 interposed between the first cooling plate 110 and the second cooling plate 120.

A cooling liquid such as a refrigerant for cooling may be present in each of the first cooling path 111 and the second cooling path 121. Water may be used as the cooling liquid or the refrigerant, but the type of the cooling liquid or the refrigerant is not limited by specific examples in the present disclosure and various suitable cooling liquids or refrigerant may be appropriately selected and applied according to usage environments, desired cooling capacity, and other considerations for the battery pack.

The first cooling plate 110, the second cooling plate 120, and the pack unit body 140 may be disposed in a direction, parallel to an X-axis, and may be stacked in a direction, parallel to a Y-axis. Each of the first cooling plate 110 and the second cooling plate 120 may be in contact with the pack unit body 140.

The first cooling plate 110 may include a first inlet pipe 112 connected to the first cooling path 111 and extending in a negative Y-direction. The first inlet pipe 112 may be provided to allow the refrigerant to flow therein. The refrigerant may be introduced into the first cooling path 111 through the first inlet pipe 112.

The second cooling plate 120 may include a second inlet pipe 122 connected to the second cooling path 121 and extending in a positive Y-direction. The second inlet pipe 122 may be provided to allow the refrigerant to flow therein. The second inlet pipe 122 may be sealingly coupled, connected, or engaged to the first inlet pipe 112, and may be separated from the first inlet pipe 112, as necessary. The refrigerant may be introduced into the second cooling path 121 through the second inlet pipe 122.

The first cooling path 111 and the first inlet pipe 112 may be sealingly coupled, connected, or engaged to each other, and the second cooling path 121 and the second inlet pipe 122 may be sealingly coupled, connected, or engaged to each other. A sealing component, such as an O-ring (not illustrated), may be used for sealingly coupling between the first cooling path 111 and the first inlet pipe 112 and between the second cooling path 121 and the second inlet pipe 122. Alternatively, a bracket for coupling (not illustrated) may be used as the sealing component, but exemplary embodiments are not limited thereto.

The structure, in which the first cooling path 111 and the second cooling path 112 are respectively provided in the first cooling plate 110 and the second cooling plate 120, is not limited by the present disclosure. In consideration of cooling characteristics of the battery pack, the first cooling path 111 and the second cooling path 121 may be respectively provided, in an appropriate form, in the first cooling plate 110 and the second cooling plate 120.

A coupling direction, a direction in which the first inlet pipe 112 and the second inlet pipe 122 are coupled to each other, may be perpendicular to the first cooling path 111. The coupling direction may be parallel to a Y-axis illustrated in FIG. 1. The coupling direction may be parallel to a height direction of a battery cell 141.

A separation direction, a direction in which the first inlet pipe 112 and the second inlet pipe 122 are separated from each other while being coupled to each other, may be perpendicular to the first cooling path 111. The separation direction may be parallel to a Y-axis illustrated in FIG. 1. However, when the coupling direction is a negative Y-direction, the separation direction may be a positive Y-direction.

Accordingly, the coupling of the first inlet pipe 112 and the second inlet pipe 122 may be completed by seating the pack unit body 140 on the second cooling plate 120 and covering the first cooling plate 110 with the pack unit body 140. This may contribute to improvement of assembly efficiency of the battery pack.

In an embodiment, the main supply pipe 130 may branch from the second inlet pipe 122 in a direction, parallel to the second cooling path 121. The main supply pipe 130 may be provided to allow the refrigerant to flow therein. A flow path, provided in the main supply pipe 130, may be disposed in a direction, parallel to the second cooling path 121.

In another embodiment, the main supply pipe 130 may branch from the first inlet pipe 112.

When the main supply pipe 130 has a structure branching from the first inlet pipe 112 or the second inlet pipe 122, a cooling structure of the battery pack may be completed only by coupling the first inlet pipe 112 and the second inlet pipe 122 to each other without an additional fastening component. Accordingly, components required to assemble the battery pack may significantly decrease in size, and manufacturing costs may be reduced. In addition, the main supply pipe 130 may be formed to be integrated with the first inlet pipe 112 or the second inlet pipe 122.

In addition, since the components required to assemble the battery pack significantly decrease in size, space efficiency of the battery pack may be improved.

In addition, when the space efficiency of the battery pack is improved, the number of mounted battery cells 141 may be increased as compared with the same volume.

In addition, unnecessary components may be excluded to reduce a weight of the battery pack.

The main supply pipe 130 may be connected to the pump 160. The pump 160 may receive the refrigerant from a tank (not illustrated) in which the refrigerant is stored, and may supply the received refrigerant to the main supply pipe 130. In an embodiment, the pump 160 may be provided in a vehicle provided with a battery pack. However, exemplary embodiments are not limited thereto, and the pump 160 may be replaced with another power generation unit according to characteristics of a mechanical apparatus in which the battery pack is mounted.

Figures 2, 3:
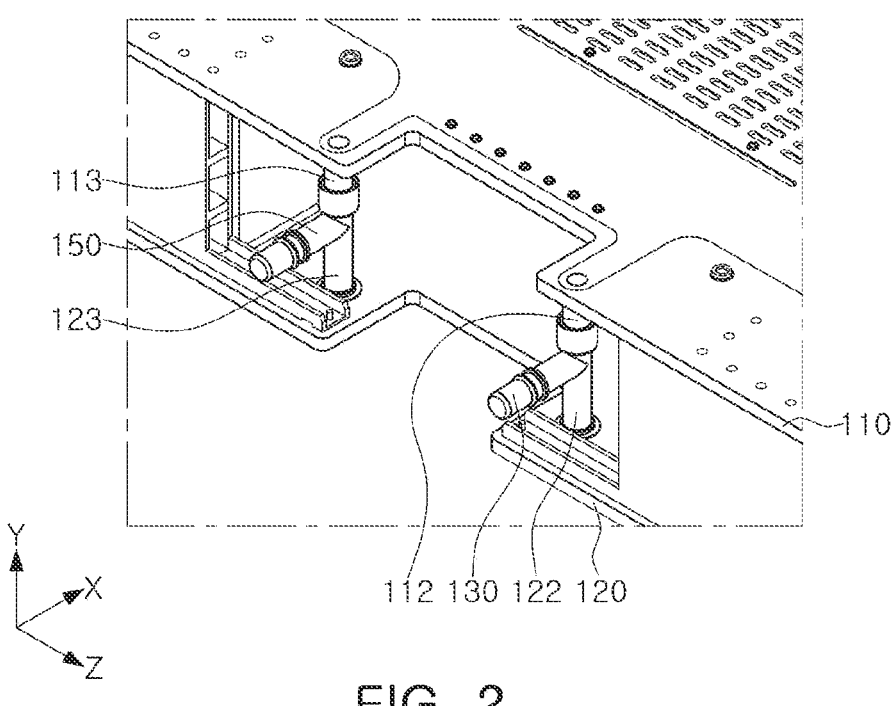
FIG. 2 is a partially perspective view of a battery pack according to an embodiment of the present disclosure.
FIG. 3 is an enlarged cross-sectional view of front end regions of a first cooling plate and a second cooling plate according to an embodiment of the present disclosure.

FIG. 2 is a partially perspective view of a battery pack according to an embodiment of the present disclosure.

As illustrated in FIG. 2, in an embodiment, the first cooling plate 110 may include a first outlet pipe 113 connected to the first cooling path (111 of FIG. 1) in a region, different from a region in which the first inlet pipe 112 is disposed.

In addition, the second cooling plate 120 may include a second outlet pipe 123 connected to the second cooling path (121 of FIG. 1) in a region, different from a region in which the second inlet pipe 122 is disposed. The second outlet pipe 123 may be sealingly coupled, connected, or engaged to the first outlet pipe 113. The first outlet pipe 113 and the second outlet pipe 123 may be coupled to each other in a direction, parallel to a Y-axis, and may be separated from each other in a direction, parallel to the Y-axis.

The first outlet pipe 113 may be a path by which the refrigerant of the first cooling path (111 of FIG. 1) is discharged outwardly of the first cooling plate 110.

The second outlet pipe 123 may be a path by which the refrigerant of the second cooling path (121 of FIG. 1) is discharged outwardly of the second cooling plate 120.

The main outlet pipe 150 may branch from the first outlet pipe 113 or the second outlet pipe 123. The battery pack according to an embodiment may include a main outlet pipe 150 branching from the second outlet pipe 123. However, the main outlet pipe 150 may branch from the first outlet pipe 113. When the main outlet pipe 150 has a structure branching from the first outlet pipe 113 or the second outlet pipe 123, a cooling structure of the battery pack may be completed only by coupling the first outlet pipe 113 and the second outlet pipe 123 to each other without an additional fastening component. Accordingly, components required to assemble the battery pack may significantly decrease in size, and manufacturing costs may be reduced. In addition, the main outlet pipe 150 may be formed to be integrated with the first outlet pipe 113 or the second outlet pipe 123.

The main outlet pipe 150 may be provided to discharge the refrigerant, supplied from the first outlet pipe 113 and the second outlet pipe 123, to the outside of the main outlet pipe 150. A drain pipe (not illustrated) may be additionally connected to the main outlet pipe 150 to collect refrigerant, and the collected refrigerant may be supplied to an additional heat exchange device (not illustrated). Accordingly, the refrigerant may be circulated in the first cooling path (111 of FIG. 1) and the second cooling path (121 of FIG. 1), and the cooling efficiency of the battery cell (141 of FIG. 1) may be improved.

In an embodiment, the first inlet pipe 112, the second inlet pipe 122, the first outlet pipe 113, and the second outlet pipe 123 may be disposed in a front end region of the first cooling plate 110 or the second cooling plate 120.

In addition, in an embodiment, at least a portion of the first inlet pipe 112, the second inlet pipe 122, the first outlet pipe 113, and the second outlet pipe 123 may be present on a lower surface or an upper surface of the cooling plate 110 or the second cooling plate 120.

In addition, in an embodiment, the first inlet pipe 112, the second inlet pipe 122, the first outlet pipe 113 and the second outlet pipe 123 may be present outside a periphery of the pack unit body (140 of FIG. 1) on the first cooling plate 110 or the second cooling plate 120. Accordingly, a cooling structure, capable of significantly reducing a volume of the battery pack, may be implemented.

FIG. 3 is an enlarged cross-sectional view of front end regions of the first cooling plate 110 and the second cooling plate 120, and is a cross-sectional view of the first inlet pipe 112 and the second inlet pipe 122.

A flow path, by which the refrigerant flows in the main supply pipe 130, may be connected to a flow path, by which the refrigerant is introduced from the first inlet pipe 112, and a flow path by which the refrigerant flows in the second inlet pipe 122.

In the main supply pipe 130, the refrigerant may flow in a first flow direction D1. The refrigerant, present in the main supply pipe 130, may be introduced into the first inlet pipe 112 and the second inlet pipe 122 by a pressure provided by the pump (160 of FIG. 1).

In the first inlet pipe 112 and the second inlet pipe 122, the refrigerant may flow in a second flow direction. The second flow direction may be parallel to a direction in which the first inlet pipe 112 is coupled to the second inlet pipe 122, and may be perpendicular to the first flow direction. The second flow direction may include a second upper flow direction D21, a flow direction in the first inlet pipe 112, and a second lower flow direction D22, a flow direction in the second inlet pipe 122.

In the first inlet pipe 112, the refrigerant may flow in the second upper flow direction D21 to be supplied to the first cooling path 111. In the second inlet pipe 122, the refrigerant may flow in the second lower flow direction D22 to be supplied to the second cooling path 121.

In an embodiment, a diameter of the flow path, by which the refrigerant flows in the first inlet pipe 112, and a diameter of the flow path, by which the refrigerant flows in the second inlet pipe 122, may be the same. Accordingly, the refrigerant may be uniformly distributed to the first cooling path 111 and the second cooling path 121.

The refrigerant, present in the first cooling path 111, may be discharged through the first outlet pipe (113 of FIG. 2). The refrigerant, present in the second cooling path 121, may be discharged through the second outlet pipe (123 of FIG.). The refrigerant of the first outlet pipe (113 of FIG. 2) and the second outlet pipe (123 of FIG. 2) meet in the main outlet pipe (150 of FIG. 2), and may be finally discharged outwardly of the first cooling plate 110 and the second cooling plate 120 through the main outlet pipe (150 of FIG. 2).

The battery cell 141, disposed to be followed by the first inlet pipe 112 and the second inlet pipe 122 in an X-axis direction, may have a side surface surrounded by a side frame 170. The side frame 170 may be in contact with the first cooling plate 110 and the second cooling plate 120 to protect the side surface of the battery cell 141.

The side frame 170 may partition a space, in which the battery cell 141 is installed, and a space in which the first inlet pipe 112, the second inlet pipe 122, the first outlet pipe (113 of FIG. 2), and the second outlet pipe (FIG. 2 of 123) are installed. The side frame 170 may prevent the refrigerant from being introduced into the battery cell 141 even when the refrigerant is discharged from the front end regions of the first cooling plate 110 and the second cooling plate 120.

Figure 4:
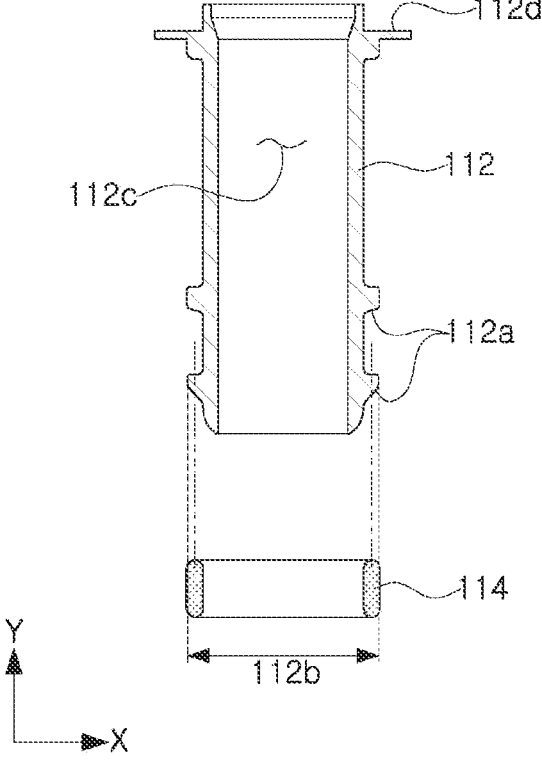
FIG. 4 is a cross-sectional view of a first inlet pipe according to an embodiment of the present disclosure.

FIG. 4 is a cross-sectional view of the first inlet pipe 112 according to an embodiment of the present disclosure.

As illustrated in FIG. 4, the first inlet pipe 112 may have an internal flow path 112c provided therein, and a refrigerant may flow in the internal flow path 112c.

The first inlet pipe 112 may have one side provided with a first flange 112d protruding in a positive X-direction and a negative X-direction. The first flange 112d may be in contact with the first cooling plate (110 of FIG. 3), and components such as a bolt (not illustrated), and the like, may pass through the first flange 112d. In another embodiment, the first flange 112d may be welded to the first cooling plate (110 of FIG. 3). According to the first flange 112d, the first inlet pipe 112 may be easily coupled to the first cooling plate (110 of FIG. 3).

The first inlet pipe 112 may have the other side provided with a plurality of projections 112a protruding in the positive X-direction and the negative X-direction. In the first inlet pipe 112, a region in which the projection 112a is present may be a coupling portion to the second inlet pipe (122 of FIG. 3). In the first inlet pipe 112, an external diameter 112b of the region in which the projection 112a is present may be smaller than an internal diameter (122a of FIG. 5) of the second inlet pipe (122 of FIG. 5). Accordingly, the first inlet pipe 112 may be fitted and coupled to the second inlet pipe (122 of FIG. 3). The fitting coupling may contribute to improvement of assembling properties of the first inlet pipe 112 and the second inlet pipe (122 of FIG. 3).

In an embodiment, a sealing member 114 may be provided on an external surface of the first inlet pipe 112. The sealing member 114 may be disposed between the external surface of the first inlet pipe 112 and an internal surface of the second inlet pipe (122 of FIG. 3) to prevent the refrigerant from being discharged. The sealing member 114 may be formed of a material including rubber, urethane, or the like. However, exemplary embodiments are not limited thereto, and the material of the sealing member 114 may be appropriately changed and applied depending on the type of refrigerant, usage environments of the battery pack, specifications of the battery pack, and the like. The sealing member 114 may also be disposed between an external surface of the first outlet pipe (113 of FIG. 2) and an internal surface of the second outlet pipe (123 of FIG. 2).

Figure 5:
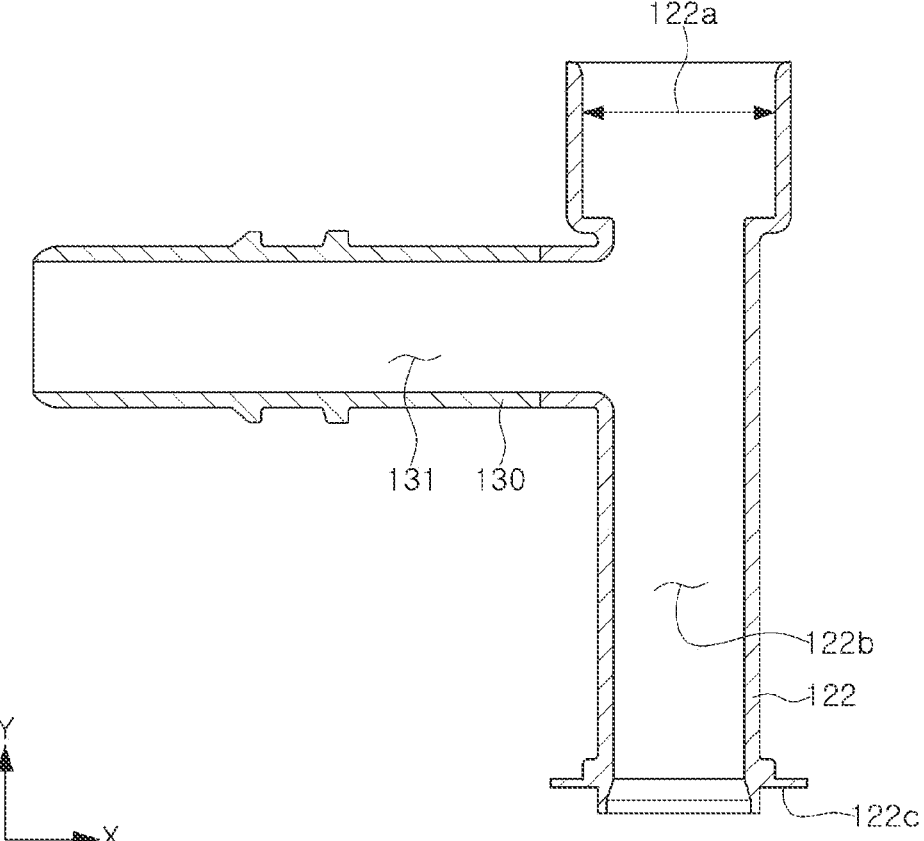
FIG. 5 is a cross-sectional view of a second inlet pipe and a main supply pipe according to an embodiment of the present disclosure.

FIG. 5 is a cross-sectional view of a second inlet pipe 122 and a main supply pipe 130 according to an embodiment of the present disclosure.

As illustrated in FIG. 5, an internal flow path 122b may be formed in the second inlet pipe 122 in a direction, parallel to a Y-axis, and a refrigerant may flow in the internal flow path 122b. An internal diameter 122a in an uppermost portion of the second inlet pipe 122 in a positive Y-direction may be larger than an external diameter (112b of FIG. 4) of the first inlet pipe (112 of FIG. 4).

The internal diameter 122a of the second inlet pipe 122 may be the same as an internal diameter 122a of an uppermost portion of the second inlet pipe 122 in a positive Y-direction, from an uppermost portion of the second inlet pipe 122 in the positive Y-direction to a certain section in the negative Y-direction. The section, in which the internal diameter of the second inlet pipe 122 is the same as the internal diameter 122a in the uppermost portion of the second inlet pipe 122 in the positive Y-direction, may be a coupling portion to the first inlet pipe (112 of FIG. 4).

In an embodiment, the internal diameter 122a in the uppermost portion of the second inlet pipe 122 in the positive Y-direction and the external diameter (112b of FIG. 4) of the first inlet pipe (112 of FIG. 4) may be provided to have a loose fit tolerance or a medium fit tolerance. Accordingly, fitting coupling between the first inlet pipe (112 of FIG. 4) and the second inlet pipe 122 may be facilitated, and assembling properties of the first inlet pipe (112 of FIG. 4) and the second inlet pipe 122 may be improved. What has been described above may be equally applied to coupling between the first outlet pipe (113 of FIG. 2) and the second outlet pipe (123 of FIG. 2).

A lower portion of the second inlet pipe 122 in a negative Y-direction may be provided with a second flange 122c protruding in a radial direction of the second inlet pipe 122. The second flange 122c may be in contact with the second cooling plate (120 of FIG. 3), and components such as a bolt (not illustrated), and the like, may pass through the second flange 122c. In another embodiment, the second flange 122c may be welded to the second cooling plate (120 of FIG. 3). According to the second flange 122c, the second inlet pipe 122 may be easily coupled to the second cooling plate (120 of FIG. 3).

The main supply pipe 130 may branch from the second inlet pipe 122. An internal flow path 131 may be formed in the main supply pipe 130 in a direction, parallel to the X-axis, and may be connected to an internal flow path 122b of the second inlet pipe 122. The main supply pipe 130 may be provided to be integrated with the second inlet pipe 122, or may be coupled to the second inlet pipe 122 by welding, or the like. However, exemplary embodiments are not limited thereto.

In an embodiment, at least a portion of an external periphery of the main supply pipe 130 may have a shape protruding in a radial direction thereof, which may contribute to easy coupling between the main supply pipe 130 and a pipe (not illustrated) or a hose (not illustrated) extending from the pump (160 of FIG. 1).

In an embodiment, at least one of the first inlet pipe 112, the second inlet pipe (122 of FIG. 2), the first outlet pipe (113 of FIG. 2), the second outlet pipe (123 of FIG. 2), the main supply pipe (130 of FIG. 2), and the main outlet pipe (150 of FIG. 2) may be provided to be flexible.

In an embodiment, at least one of the first inlet pipe 112, the second inlet pipe (122 of FIG. 2), the first outlet pipe (113 of FIG. 2), the second outlet pipe (123 of FIG. 2), the main supply pipe (130 of FIG. 2), and the main outlet pipe (150 of FIG. 2) may be formed of a material including a flexible material.

In an embodiment, at least one of the first inlet pipe 112, the second inlet pipe (122 of FIG. 2), the first outlet pipe (113 of FIG. 2), the second outlet pipe (123 of FIG. 2), the main supply pipe (130 of FIG. 2), and the main outlet pipe (150 of FIG. 2) may be provided with a corrugated external periphery to be subject to at least one of extension, contraction, and bending deformation.

Accordingly, it may contribute to improvement of assembling efficiency of the battery pack and improvement of space utilization efficiency.

Figure 6:
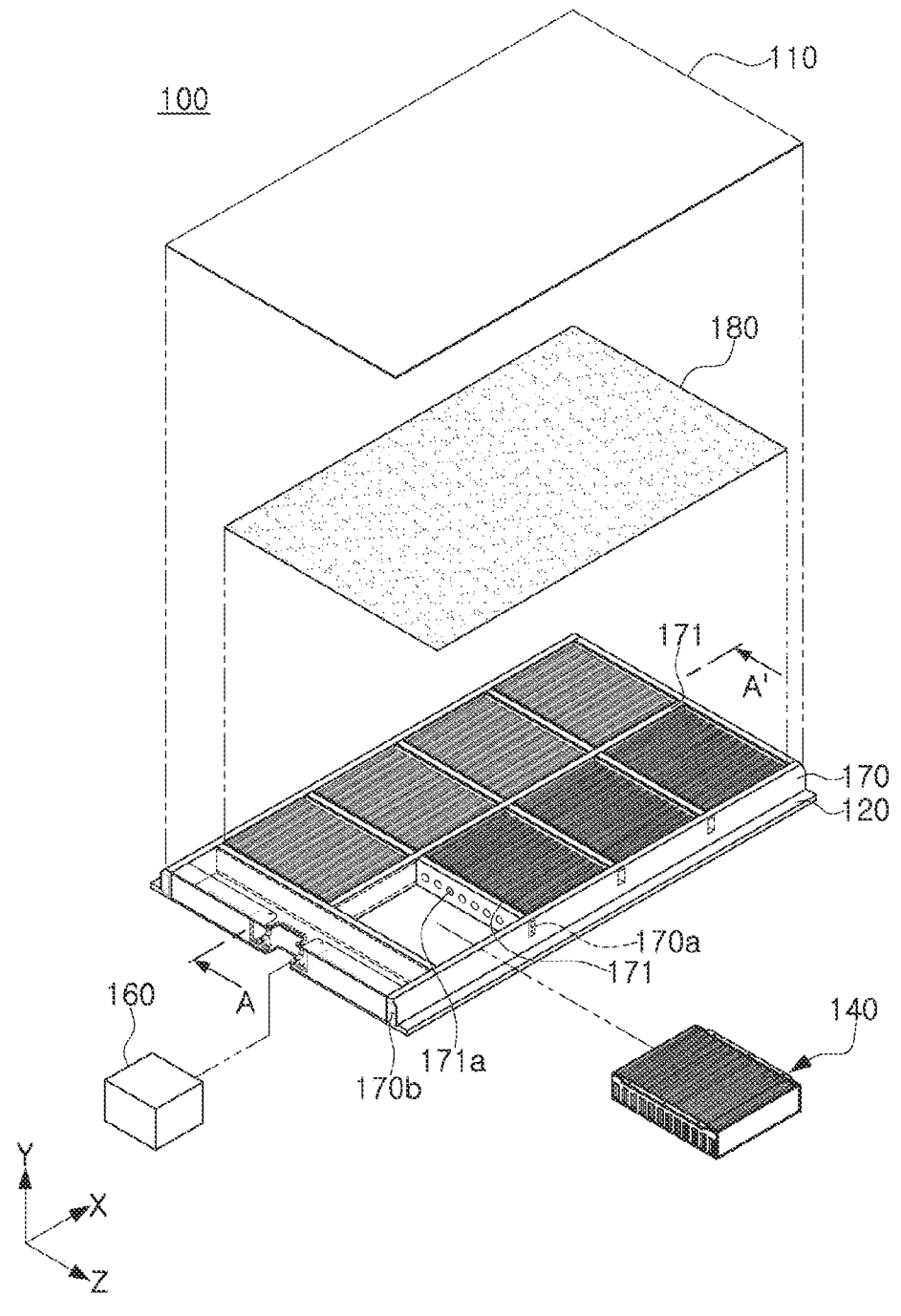
FIG. 6 is an exploded perspective view of a battery pack according to an embodiment of the present disclosure.

FIG. 6 is an exploded perspective view of a battery pack 100 according to an embodiment of the present disclosure.

As illustrated of FIG. 6, the battery pack 100 according to an embodiment may include a side frame 170 facing a pack unit body 140. The side frame 170 may include a partition wall frame 171 partitioning a space in which a plurality of pack unit bodies 140 are accommodated. The partition wall frame 171 may be disposed in a direction, parallel to an X-axis, and a direction, parallel to a Z-axis, and the plurality of pack unit bodies 140 may be accommodated in a space partitioned by the side frame 170 and the partition wall frame 171.

The side frame 170 may have a first venting hole 170a in a region facing the partition wall frame 171. An inside of the side frame 170 may be provided have a hollow, and the hollow may be a second venting hole 170b. The second venting hole 170b may be a path by which gas is discharged outwardly of the battery pack.

The partition wall frame 171 may have a third venting hole 171a in a region facing the pack unit body 140. The third venting hole 171a may be a path by which the gas, discharged from the pack unit body 140, is introduced. The gas, introduced into the third venting hole 171a, may be introduced into the first venting hole 170a of the side frame 170 and may be then discharged outwardly through the second venting hole 170b. Matters regarding the number and diameter of the third venting hole 171a may be appropriately selected and applied depending on the number of battery cells 141, usage environments of the battery pack 100, specifications required for the battery pack 100, and the like, but exemplary embodiments are not limited thereto.

In an embodiment, a cover member 180 may be provided in upper portions of the pack unit body 140, the partition wall frame 171, and the side frame 170 in the positive Y-direction. The cover member 180 may be in contact with at least one of the side frame 170 and the partition wall frame 171, and may serve to block gas movement or gas propagation between the plurality of pack unit bodies 140.

In an embodiment, the cover member 180 may include a plurality of cover members provided to correspond to the pack unit bodies 140 in a one-to-one correspondence. However, exemplary embodiments are not limited thereto, and such a matter may be appropriately selected and applied depending on the usage environments of the battery pack, and the like.

In an embodiment, a first cooling plate 110 may be provided on an upper portion of the cover member 180 in a positive Y-direction. The cooling plate may be coupled to at least one of the cover member 180 and the side frame 170 to pressurize the cover member 180 and the pack unit body 140 in a negative Y-direction.

Figure 7:
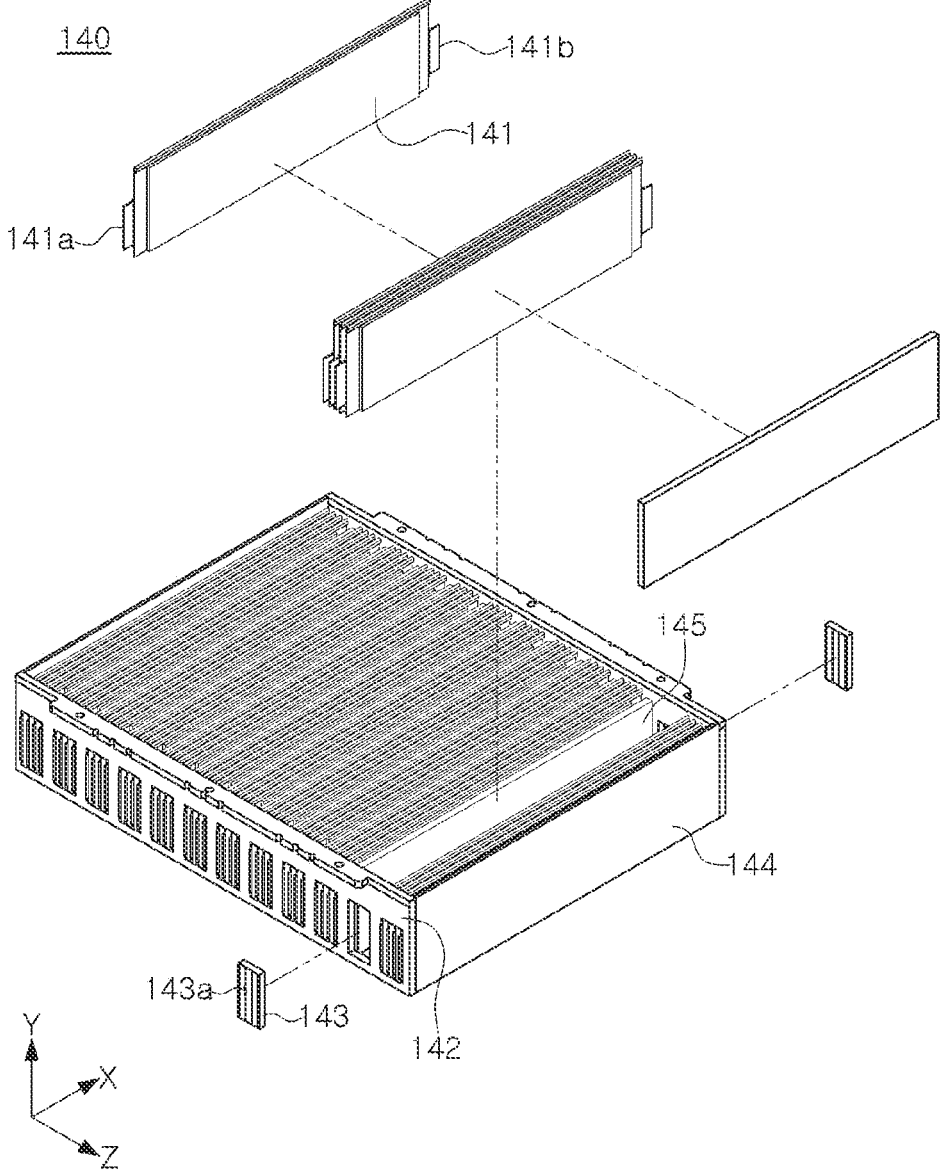
FIG. 7 is a partially exploded perspective view of a battery pack according to an embodiment of the present disclosure.

FIG. 7 is a partially exploded perspective view of a battery pack 140 according to an embodiment of the present disclosure.

As illustrated of FIG. 7, the pack unit body 140 may include a plurality of battery cells 141, and at least one pad 145 may be provided between the plurality of battery cells 141. The pad 145 may be in contact with the battery cell 141 to perform cooling or to respond to a change in volume of the battery cell 141.

A positive electrode tab 141a may be drawn out to one side of the battery cell 141, and a negative electrode tab 141b may be drawn out to the other side of the battery cell 141. However, a direction in which the positive electrode tab 141a and the negative electrode tab 141b are drawn out is not limited by the present disclosure.

The plurality of battery cells 141 may be supported by a bus bar frame 142. The bus bar frame 142 may be provided to face the third venting hole (171a of FIG. 6) of the partition frame (171 of FIG. 6). In addition, the bus bar frame 142 may be formed of an insulating material, and may include a bus bar member 143 to which the positive tab 141a and the negative tab 141b of the plurality of battery cells 141 are electrically connected. The bus bar member 143 may include a plurality of the bus bar members 143 provided on the bus bar frame 142.

The bus bar member 143 may have a slot 143a into which the positive electrode tab 141a and the negative electrode tab 141b are inserted. The positive electrode tab 141a and the negative electrode tab 141b may be inserted into the slot 143a to be welded.

The battery cells 141, disposed on front and rear surfaces of the pack unit body 140, may face an end plate 144, and the end plate 144 may be disposed in a region in which the bus bar frame 142 is absent. In an embodiment, the end plate 144 may be coupled to the bus bar frame 142. However, exemplary embodiments are not limited thereto, and such a matter may be appropriately selected and applied depending on required battery pack specifications, usage environments of the battery pack, and the like.

As described above, when the plurality of battery cells 141 are supported by the bus bar frame 142 and the end plate 144, the pack unit body 140 may be completed without using an additional member, to be advantageous for reducing weight of the entire battery pack.

Figure 8:
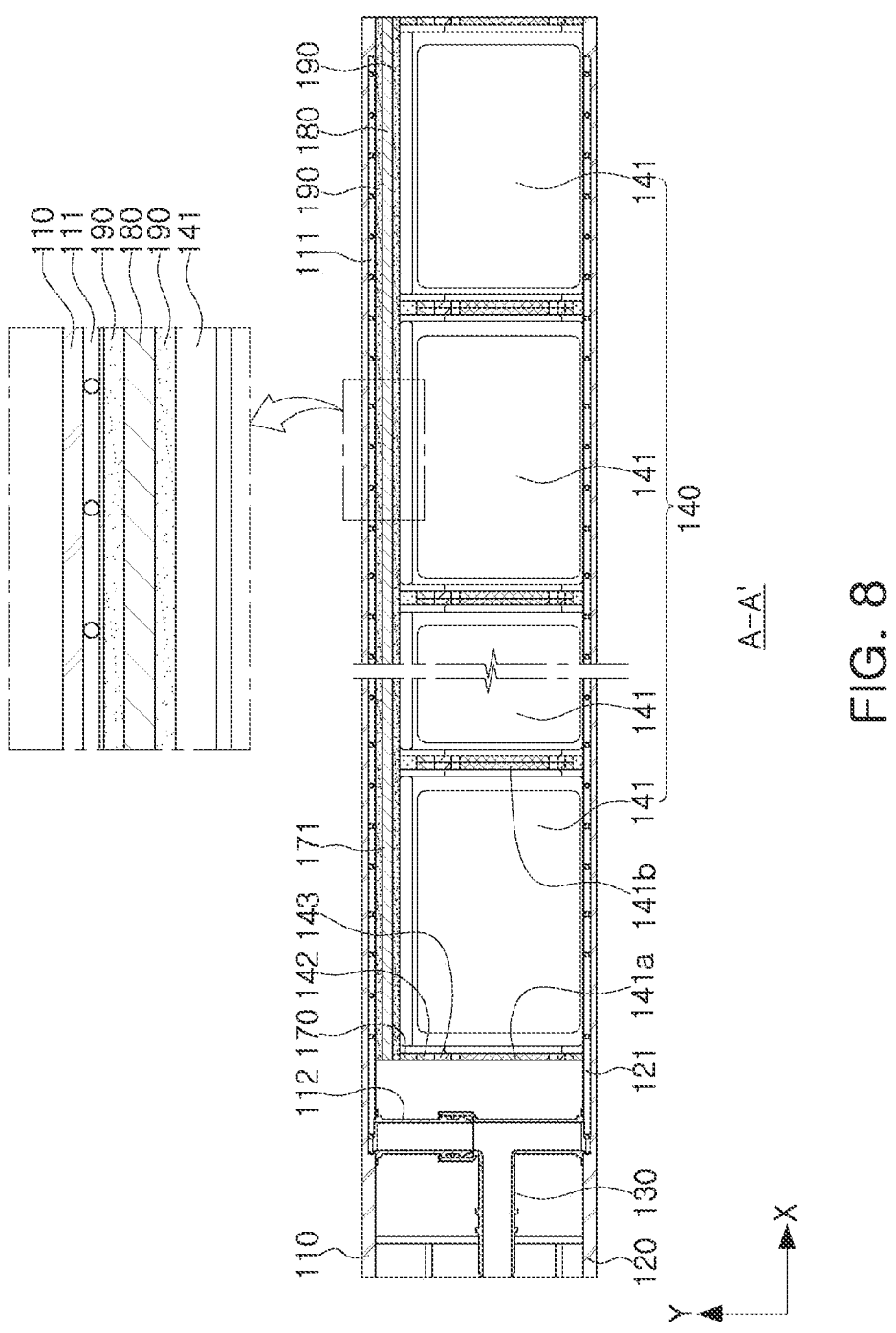
FIG. 8 is a cross-sectional view taken along line A-A' of FIG. 6.

FIG. 8 is a cross-sectional view taken along line A-A' of FIG. 6.

As illustrated of FIG. 8, a battery pack according to an embodiment may include a heat transfer material 190 interposed between the cover member 180 and the first cooling plate 110 and between the cover member 180 and the pack unit body 140. The heat transfer material 190 may be provided in the form of a pad to be in contact with the cover member 180, the first cooling plate 110, and the pack unit body 140. Alternatively, the heat transfer material 190 may be provided in the form of liquid or gel to be applied to the cover member 180, the first cooling plate 110, and the pack unit body 140.

In an embodiment, the heat transfer material 190 may be formed of a material including an insulating material and a material having high thermal conductivity.

In addition, in an embodiment, the heat transfer material 190 may include at least one of a thermal resin, a thermal grease, a thermal adhesive, an epoxy resin, and a heat dissipation pad.

When the first cooling plate 110 is disposed on the battery cell 141, the heat transfer material 190 may include at least one of a thermal grease, a thermal conductive adhesive, an epoxy resin, and a heat dissipation pad.

Figure 9:
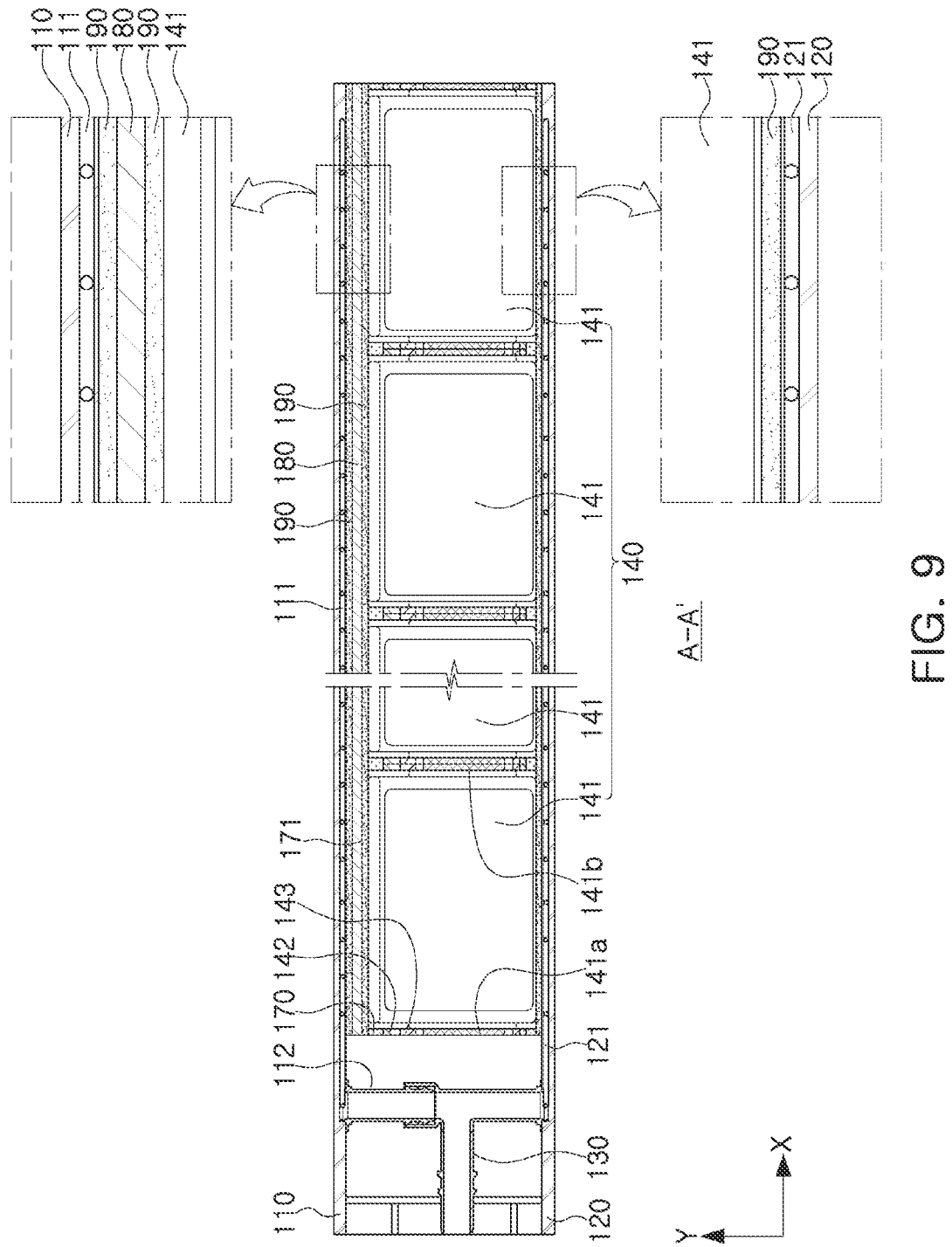
FIG. 9 is a cross-sectional view taken along line A-A' of FIG. 6 and illustrating a battery pack according to another embodiment of the present disclosure.

FIG. 9 is a cross-sectional view taken along line A-A' of FIG. 6 and illustrating a battery pack according to another embodiment of the present disclosure.

As illustrated of FIG. 9, the battery pack according to another embodiment may include a heat transfer material 190 between a pack unit body 140 and a second cooling plate 120. The same matters as the above-described heat transfer material 190 may be applied to the heat transfer material 190 provided between the pack unit body 140 and the second cooling plate 120.

The heat transfer material 190 may improve the assembling efficiency of the pack unit body 140, and may improve cooling efficiency of the battery cell 141 and the battery pack (100 of FIG. 6).

When the first cooling plate 110 and the second cooling plate 120 are respectively disposed above and below the pack unit body 140, the pack unit body 140 may be cooled above and below the pack unit body 140. Therefore, cooling efficiency of the battery pack (100 of FIG. 6) may be improved.

As described above, cooling efficiency of a battery cell may be improved.

In addition, assembly efficiency and space utilization efficiency of a battery cell may be improved.

While specific examples of implementations have been illustrated and described above, variations or enhancements of the disclosed implementations and other implementations may be made based on what is disclosed in this patent document.

What is claimed is:

1. A battery pack comprising:

a first cooling plate including a first cooling path, along which a refrigerant is circulated, and a first inlet pipe connected to the first cooling path;

a second cooling plate including a second cooling path, along which a refrigerant is circulated, and a second inlet pipe connected to the second cooling path and sealingly engaged to the first inlet pipe;

a main supply pipe branching from the first inlet pipe or the second inlet pipe and supplying a refrigerant to the first inlet pipe and the second inlet pipe; and a pack unit body including at least one battery cell and disposed between the first cooling plate and the second cooling plate;

a side frame facing the pack unit body; and a cover member disposed between the first cooling plate or the second cooling plate and the pack unit body to cover the pack unit body, wherein the side frame has a first venting hole and a second venting hole connected to the outside, and the side frame further includes a partition wall frame including a third venting hole connected to the first venting hole and connected to the side frame such that the third venting hole faces the pack unit body.

2. The battery pack of claim 1, wherein:

the first cooling plate further includes a first outlet pipe connected to the first cooling path;

the second cooling plate further includes a second outlet pipe connected to the second cooling path and sealingly engaged to the first outlet pipe; and wherein the battery pack further includes a main outlet pipe branching from the first outlet pipe or the second outlet pipe and discharging, to the outside, a refrigerant that is received from the first outlet pipe and the second outlet pipe.

3. The battery pack of claim 2, wherein:

the first inlet pipe is coupled to the second inlet pipe in a coupling direction parallel to a height direction of the battery cell.

4. The battery pack of claim 3, wherein:

the main supply pipe and the main outlet pipe allow a refrigerant to flow in a first flow direction perpendicular to the coupling direction; and the first inlet pipe, the first outlet pipe, the second inlet pipe, and the second outlet pipe allow a refrigerant to flow in a second flow direction parallel to the coupling direction.

5. The battery pack of claim 2, wherein:

at least one of the first inlet pipe or the first outlet pipe is formed such that an external diameter in a coupling portion to at least one of the second inlet pipe or the second outlet pipe is smaller than an internal diameter in a coupling portion to at least one of the second inlet pipe or the second outlet pipe; and the first inlet pipe and the first outlet pipe are fitted and coupled to the second inlet pipe and the second outlet pipe, respectively.

6. The battery pack of claim 5, wherein:

the first inlet pipe and the first outlet pipe have a loose fit tolerance or a medium fit tolerance to the second inlet pipe and the second outlet pipe, respectively.

7. The battery pack of claim 6, further comprising:

a sealing member disposed in at least one of a position between an external surface of the first inlet pipe and an internal surface of the second inlet pipe or a position between an external surface of the first outlet pipe and an internal surface of the second outlet pipe.

8. The battery pack of claim 1, wherein:

the cover member is disposed between the first cooling plate and the pack unit body; and wherein the battery pack further includes a heat transfer material disposed in at least one of a position between the cover member and the first cooling plate or a position between the cover member and the pack unit body.

9. The battery pack of claim 8, wherein:

the heat transfer material is further disposed between the pack unit body and the second cooling plate.

10. The battery pack of claim 2, wherein:

at least one of the first inlet pipe, the first outlet pipe, the second inlet pipe, the second outlet pipe, the main supply pipe, or the main outlet pipe is formed to be flexible.

\* \* \* \* \*